(12) United States Patent
Nakamura

(10) Patent No.: US 10,726,138 B2
(45) Date of Patent: Jul. 28, 2020

(54) UNAUTHORIZATION DETERMINATION SYSTEM AND UNAUTHORIZATION DETERMINATION METHOD

(71) Applicant: TOYOTA JIDOSHA KABUSHIKI KAISHA, Toyota-shi, Aichi-ken (JP)

(72) Inventor: Tetsuro Nakamura, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 219 days.

(21) Appl. No.: 15/872,423

(22) Filed: Jan. 16, 2018

(65) Prior Publication Data

US 2018/0204015 A1 Jul. 19, 2018

(30) Foreign Application Priority Data

Jan. 18, 2017 (JP) .................................. 2017-007090

(51) Int. Cl.
| | |
|---|---|
| *G06F 21/60* | (2013.01) |
| *H04W 12/08* | (2009.01) |
| *G06F 21/62* | (2013.01) |
| *H04W 4/48* | (2018.01) |
| *G06F 12/14* | (2006.01) |
| *G06F 21/57* | (2013.01) |

(52) U.S. Cl.
CPC ............ *G06F 21/604* (2013.01); *G06F 12/14* (2013.01); *G06F 21/57* (2013.01); *G06F 21/62* (2013.01); *H04W 4/48* (2018.02); *H04W 12/08* (2013.01)

(58) Field of Classification Search
CPC ........ G06F 21/604; G06F 21/57; G06F 12/14; G06F 21/62; G06F 21/6218; H04W 4/48; H04W 12/08; H04W 4/44; H04L 63/205; H04L 63/10
See application file for complete search history.

(56) References Cited

U.S. PATENT DOCUMENTS

| | | | | |
|---|---|---|---|---|
| 6,694,235 | B2 * | 2/2004 | Akiyama | ............... G06F 21/335 455/418 |
| 9,840,212 | B2 * | 12/2017 | Ben Noon | ............. B60R 16/023 |
| 9,854,442 | B2 * | 12/2017 | Mazzara, Jr. | ......... H04W 12/08 |
| 10,214,182 | B2 * | 2/2019 | Murase | ................. B60R 25/307 |
| 10,372,121 | B2 * | 8/2019 | Whitaker | .............. B60W 10/04 |
| 2008/0148409 | A1 | 6/2008 | Ampunan et al. | |
| 2011/0083161 | A1 * | 4/2011 | Ishida | ..................... H04L 12/40 726/2 |
| 2012/0303972 | A1 | 11/2012 | Kuno et al. | |
| 2014/0196114 | A1 * | 7/2014 | Hirashima | ............ G06F 21/445 726/4 |

(Continued)

FOREIGN PATENT DOCUMENTS

JP 2014-021617 A 2/2014

*Primary Examiner* — Christopher A Revak
(74) *Attorney, Agent, or Firm* — Hunton Andrews Kurth LLP

(57) ABSTRACT

An unauthorization determination system includes a memory device that is mounted in a vehicle and includes a predetermined non-access area, a connection device mounted in the vehicle and configured to be connected to the external device in a wired or wireless manner, and an ECU configured to, in a case where access to the non-access area is requested from the external device or in a case where the non-access area is accessed by the external device, determine that the access from the external device is unauthorized.

17 Claims, 6 Drawing Sheets

(56) References Cited

U.S. PATENT DOCUMENTS

| | | | |
|---|---|---|---|
| 2015/0020152 A1* | 1/2015 | Litichever | H04L 63/14 |
| | | | 726/1 |
| 2018/0074929 A1* | 3/2018 | Kito | G06F 21/568 |
| 2018/0141439 A1* | 5/2018 | Shin | B60L 3/0084 |
| 2018/0285885 A1* | 10/2018 | Laberteaux | G06Q 30/018 |
| 2019/0132311 A1* | 5/2019 | Koshimae | H04L 63/0853 |
| 2019/0294783 A1* | 9/2019 | Ujiie | B60R 16/0231 |
| 2019/0303588 A1* | 10/2019 | Litichever | H04L 12/40143 |

* cited by examiner

UNAUTHORIZATION DETERMINATION SYSTEM AND UNAUTHORIZATION DETERMINATION METHOD

INCORPORATION BY REFERENCE

The disclosure of Japanese Patent Application No. 2017-007090 filed on Jan. 18, 2017 including the specification, drawings and abstract is incorporated herein by reference in its entirety.

BACKGROUND

1. Technical Field

The present disclosure relates to an unauthorization determination system and an unauthorization determination method.

2. Description of Related Art

A related art which permits exchange of information between an external device and an in-vehicle electronic control unit (ECU) when body system equipment of a vehicle is operated according to a specific operation procedure or a password is input is known (for example, see Japanese Unexamined Patent Application Publication No. 2014-021617 (JP 2014-021617 A)).

SUMMARY

However, in the related art, in a case where the specific operation procedure or the password is leaked, it is difficult to detect unauthorized access from the external device.

An aspect of the present disclosure provides an unauthorization determination system and an unauthorization determination method capable of increasing confidentiality to unauthorized access from an external device.

A first aspect of the present disclosure includes: a memory device that is mounted in a vehicle and includes a predetermined non-access area; a connection device mounted in the vehicle and configured to be connected to an external device in a wired or wireless manner; and an electronic control unit configured to, in a case where access to the non-access area is requested from the external device or in a case where the non-access area is accessed by the external device, determine that the access from the external device is unauthorized and output a determination result.

According to the first aspect of the present disclosure, in a case where an area that the external device designates as an access destination is a predetermined non-access area included in the memory, determination is made that the access from the external device is unauthorized. Accordingly, in a case of a configuration in which an input of authentication information, such as a password or a specific operation procedure, is needed, even though the authentication information is leaked, it is possible to increase confidentiality to unauthorized access from the external device. Alternatively, in a case of a configuration in which the input of the authentication information, such as a password, is unneeded, since the authentication information is unneeded to begin with, it is possible to increase confidentiality to unauthorized access from the external device.

In the unauthorization determination system according to the first aspect of the present disclosure, the electronic control unit may be configured to, in a case where a value of a variable representing a degree that the access to the non-access area is requested from the external device or a degree that the non-access area is accessed by the external device reaches a threshold, determine that the access from the external device is unauthorized.

According to the first aspect of the present disclosure, even though an area that the external device designates as an access destination is the non-access area, until the value of the variable reaches the threshold, determination is not made that the access from the external device is unauthorized. Accordingly, for example, even though the authorized external device erroneously requests access to the non-access area or even though the authorized external device erroneously accesses the non-access area, determination is not made immediately that the access from the external device is unauthorized. Hence, for example, it is possible to prevent determination from being made immediately that the access from the authorized external device erroneously used is unauthorized.

In the unauthorization determination system according to the first aspect of the present disclosure, the electronic control unit may be configured to change the value of the variable with a weight according to an area in the non-access area that the external device requests access for or an area in the non-access area that the external device accesses.

According to the first aspect of the present disclosure, it is possible to change a degree of change until the value of the variable reaches the threshold according to the difference of the area in the non-access area that the external device requests access for or the area that the external device accesses. Accordingly, it is possible to change determination sensitivity until determination is made that the access from the external device is unauthorized according to the difference of the area that the external device requests access for or the area that the external device accesses.

In the unauthorization determination system according to the first aspect of the present disclosure, the non-access area may include a first area where first information is stored, and a second area where second information having confidentiality higher than the first information is stored. The electronic control unit may be configured to change the value of the variable to be greater in a case of access to the second area than in a case of access to the first area.

According to the first aspect of the present disclosure, since determination is easily made that the access from the external device is unauthorized in a case of access to the second area than in a case of access to the first area, safety of the second information having confidentiality higher than the first information is further improved.

In the unauthorization determination system according to the first aspect of the present disclosure, the electronic control unit may be configured to change the value of the variable to be greater in a case of write access to the non-access area than in a case of read access to the non-access area.

According to the first aspect of the present disclosure, determination is easily made that the access from the external device is unauthorized in a case of the write access to the non-access area than in a case of the read access to the non-access area. Hence, it is possible to further increase confidentiality to unauthorized write access.

In the unauthorization determination system according to the first aspect of the present disclosure, the electronic control unit may be configured to, in a case where the unauthorized access determination unit determines that the access from the external device is unauthorized, prohibit access to the memory.

According to the first aspect of the present disclosure, it is possible to protect the memory from unauthorized access after access to the memory is prohibited.

In the unauthorization determination system according to the first aspect of the present disclosure, the electronic control unit may be configured to restore the contents of the memory to a state before the unauthorized access determination unit determines that the access from the external device is unauthorized.

According to the first aspect of the present disclosure, in a case where there is unauthorized access from the external device, there is a possibility that the contents stored in the memory are rewritten. However, according to the memory content restoration unit, since it is possible to return the contents of the memory to a state before there is unauthorized access, it is possible to prevent trouble caused by the contents stored in the memory being rewritten through unauthorized access.

In the unauthorization determination system according to the first aspect of the present disclosure, the electronic control unit may be configured to restore contents deleted from the memory before determination is made that the access from the external device is unauthorized.

According to the first aspect of the present disclosure, even though contents are deleted from the memory through unauthorized access, it is possible to restore the deleted contents to the memory.

In the unauthorization determination system according to the first aspect of the present disclosure, the electronic control unit may be configured to delete contents written to the memory device until determination is made that the access from the external device is unauthorized.

According to the first aspect of the present disclosure, since it is possible to delete contents written into the memory through unauthorized access, it is possible to prevent trouble caused by the contents written into the memory through unauthorized access.

A second aspect of the present disclosure relates to an unauthorization determination method that determines unauthorized access from an external device connected to a connection unit mounted in a vehicle in a wired or wireless manner. The unauthorization determination method includes, in a case where access to a non-access area defined in a memory device mounted in the vehicle is requested from the external device or in a case where the non-access area is accessed by the external device, determining that the access from the external device is unauthorized.

According to the second aspect of the present disclosure, in a case where an area that the external device designates as an access destination is a predetermined non-access area included in the memory, determination is made that the access from the external device is unauthorized. Accordingly, similarly to the above-described aspect, it is possible to increase confidentiality to unauthorized access from the external device.

A third aspect of the present disclosure relates to an unauthorization determination system including: a memory device that is mounted in a vehicle and includes a predetermined non-access area; a connection device mounted in the vehicle and configured to be connected to an external device in a wired or wireless manner; and a center configured to, in a case where access to the non-access area is requested from the external device or in a case where the non-access area is accessed by the external device, determine that the access from the external device is unauthorized.

In the third aspect of the present disclosure, the center may be configured to, in a case where a value of a variable representing a degree that the access to the non-access area is requested from the external device or a degree that the non-access area is accessed by the external device reaches a threshold, determine that the access from the external device is unauthorized and output a determination result.

In the third aspect of the present disclosure, the center may be configured to change the value of the variable with a weight according to an area in the non-access area that the external device requests access for or an area in the non-access area that the external device accesses.

In the third aspect of the present disclosure, the non-access area may include a first area where first information is stored, and a second area where second information having confidentiality higher than the first information is stored; and the center may be configured to change the value of the variable to be greater in a case of access to the second area than in a case of access to the first area.

In the third aspect of the present disclosure, the center may be configured to change the value of the variable to be greater in a case of write access to the non-access area than in a case of read access to the non-access area.

The third aspect of the present disclosure may further includes an electronic control unit configured to, in a case where the center determines that the access from the external device is unauthorized, prohibit access to the memory device.

The third aspect of the present disclosure may further includes an electronic control unit configured to restore the contents of the memory device to a state before the center determines that the access from the external device is unauthorized.

In the third aspect of the present disclosure, the electronic control unit may be configured to restore contents deleted from the memory device before determination is made that the access from the external device is unauthorized.

The third aspect of the present disclosure may further includes an electronic control unit configured to delete contents written into the memory device until the center determines that the access from the external device is unauthorized.

According to the aspects of the present disclosure, it is possible to increase confidentiality to unauthorized access from the external device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an unauthorization determination system and an unauthorization determination method according to an embodiment will be described.

For the purpose of failure diagnosis, trouble analysis, trouble correction, or the like on the market, there is a case where an external device, such as a tool, is connected to an in-vehicle network and reading and writing of a memory in an ECU are performed by way of the in-vehicle network. For example, there is a case where failure diagnosis information or control information of the ECU is read from the memory or a control program of the ECU in the memory is rewritten.

In a case where the reading and writing functions described above are used for a wrong purpose, there is a possibility that reading of information (for example, key information used in an encryption system, or the like) having comparatively high security or rewriting of the control program is performed in an unauthorized manner. In the related art, while means for rejecting access from a user having a wrong purpose through authentication is provided, a possibility that authentication is broken is not zero.

The unauthorization determination system and the unauthorization determination method according to the embodiment described below determine unauthorized access from the external device based on a memory address that the external device designates as an access destination even though authentication is broken. In a case where determination is made that the access from the external device is unauthorized, for example, memory access after determination is made that access is unauthorized is prohibited. With this, it is possible to protect the memory from unauthorized access. In a case where determination is made that the access from the external device is unauthorized, for example, the state of the memory is returned to a state before determination is made that access is unauthorized. With this, even though unauthorized data is written into the memory through unauthorized write access, it is possible to prevent trouble caused by written unauthorized data.

Figure 1:
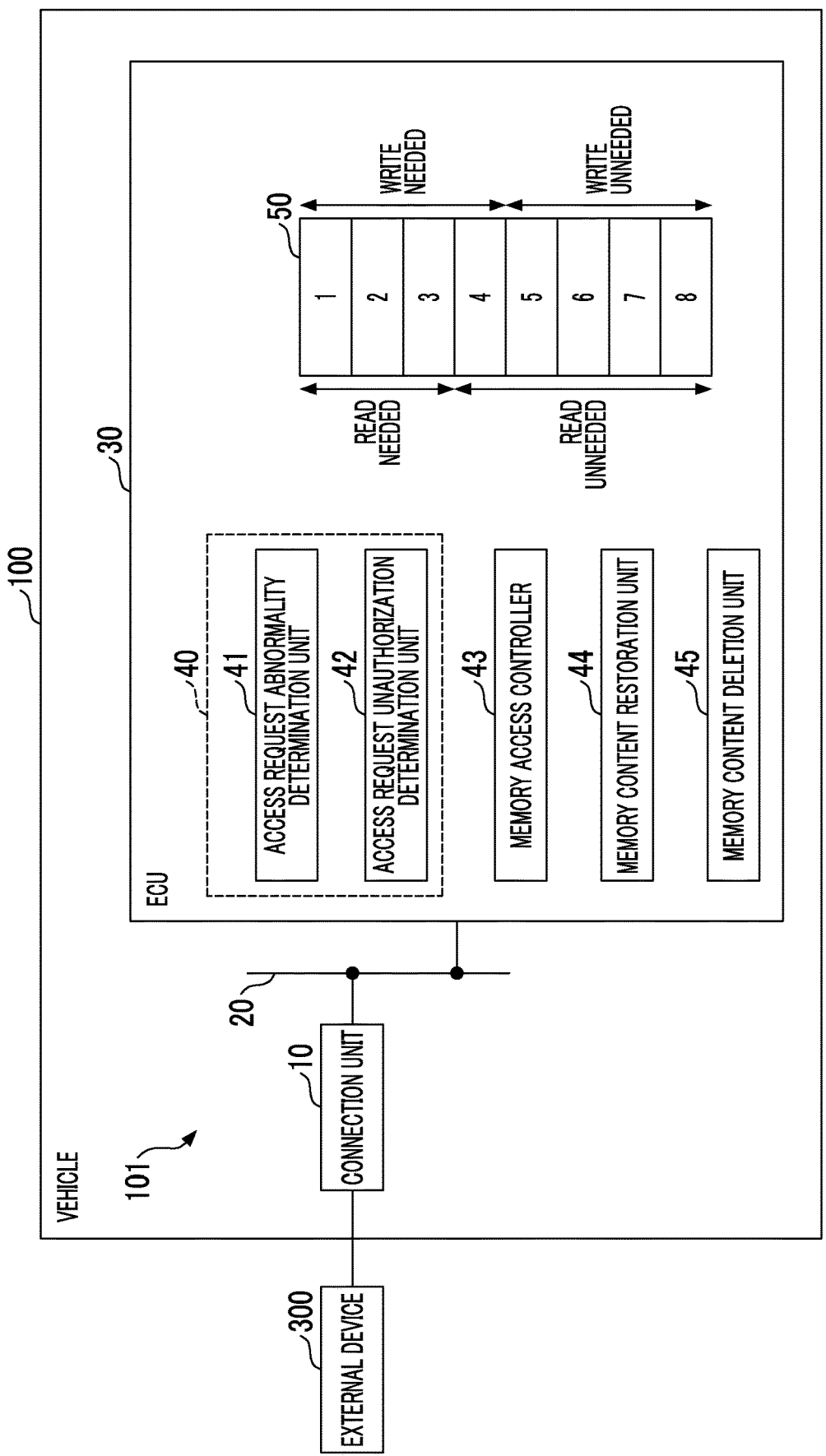
FIG. 1 is a diagram showing an example of the configuration of an unauthorization determination system according to a first embodiment.

FIG. 1 is a diagram showing an example of the configuration of an unauthorization determination system according to a first embodiment. An unauthorization determination system 101 shown in FIG. 1 determines unauthorized access from an external device 300 connected to a connection unit 10 mounted in a vehicle 100 in a wired or wireless manner. The unauthorization determination system 101 includes the connection unit 10, a communication line 20, and an ECU 30.

The connection unit 10 is mounted in the vehicle 100. The external device 300, such as a tool, is connected to the connection unit 10. The connection unit 10 and the external device 300 are connected in a wired or wireless manner. In a configuration in which the connection unit 10 and the external device 300 are connected in a wired manner, the connection unit 10 includes a connector or a connector and a communication module. In a configuration in which the connection unit 10 and the external device 300 are connected in a wireless manner, the connection unit 10 is, for example, a communication module.

As a specific example of the connector, a data link coupler (DLC) connector or the like is exemplified. The communication module has a function of relaying the external device 300 and the communication line 20. The communication module receives information transmitted from the external device 300 in a wireless manner and transmits the received information to the ECU 30 by way of a communication line 20. On the contrary, the communication module receives information transmitted from the ECU 30 to the communication line 20 and transmits the received information to the external device 300 in a wireless manner.

The communication line 20 is an example of an in-vehicle network mounted in the vehicle 100. The communication line 20 is, for example, an in-vehicle network according to a communication standard, such as a controller area network (CAN) or Ethernet (Registered Trademark). The communication line 20 may be a transmission path that connects the connection unit 10 and the ECU 30 on a one-to-one basis.

The ECU 30 is an example of an electronic control unit mounted in the vehicle 100. The ECU 30 has a memory 50, an unauthorized access determination unit 40, a memory access controller 43, a memory content restoration unit 44, and a memory content deletion unit 45. The ECU 30 has a central processing unit (CPU) as an example of a processor, and the memory 50. The functions of the unauthorized access determination unit 40, the memory access controller 43, the memory content restoration unit 44, and the memory content deletion unit 45 are realized by a program that is processed by the CPU. The program that realizes the functions is stored in the memory 50 (preferably, a non-access area in the memory 50). The details of memory areas in the memory 50 will be described below.

The unauthorized access determination unit 40 determines unauthorized access from the external device 300 connected to the connection unit 10 in a wired or wireless manner and outputs a determination result. The unauthorized access determination unit 40 has an access request abnormality determination unit 41 and an access request unauthorization determination unit 42. Hereinafter, the access request abnormality determination unit 41 is referred to as an abnormality determination unit 41, and the access request unauthorization determination unit 42 is referred to as an unauthorization determination unit 42.

The abnormality determination unit 41 determines whether an access request from the external device 300 is a normal request or an abnormal request based on a memory address that the external device 300 designates as an access destination. The memory address is given to each memory area in the memory 50 in advance.

The memory 50 illustrated in FIG. 1 represents a readable and writable nonvolatile memory. As a specific example of the nonvolatile memory, a flash memory, an electrically erasable programmable read only memory (EEPROM), or the like is exemplified.

In FIG. 1, in regard to read access, for example, memory areas 1 to 3 in the memory 50 are set as a read needed area in advance, and memory areas 4 to 8 in the memory 50 are set as a read unneeded area in advance. In FIG. 1, in regard to write access, for example, the memory areas 1 to 4 in the memory 50 are set as a write needed area in advance, and the memory areas 5 to 8 in the memory 50 are set as a write unneeded area in advance.

The memory 50 includes a predetermined access area and a predetermined non-access area. The access area represents a memory area where access from the external device 300 is needed for a predetermined purpose, such as analysis or reprogramming, or a memory area where the access from the external device 300 is permitted or supposed. The non-access area represents a memory area where the access from the external device 300 is unneeded for a predetermined purpose, such as analysis or reprogramming, or a memory area where the access from the external device 300 is not permitted or is not supposed.

The read needed area is an example of the access area, and represents, for example, a memory area where a content (information) needed to be read for the purpose of failure diagnosis or trouble analysis is stored.

The read unneeded area is an example of the non-access area, and represents, for example, a memory area other than the read needed area.

The write needed area is an example of the access area, and represents, for example, a memory area where a content (information) needed to be written for the purpose of reprogramming as a market trouble countermeasure is stored.

The write unneeded area is an example of the non-access area, and represents, for example, a memory area other than the write needed area.

In a case where a memory address that the external device 300 designates as a read target corresponds to an address of a read needed area, the abnormality determination unit 41 determines that a read access request from the external device 300 is a normal read request. In a case where the memory address that the external device 300 designates as a read target corresponds to an address of a read unneeded area, the abnormality determination unit 41 determines that the read access request from the external device 300 is an abnormal read request.

Similarly, in a case where a memory address that the external device 300 designates as a write target corresponds to an address of a write needed area, the abnormality determination unit 41 determines that a write access request from the external device 300 is a normal write request. In a case where the memory address that the external device 300 designates as a write target corresponds to an address of a write unneeded area, the abnormality determination unit 41 determines that the write access request from the external device 300 is an abnormal write request.

The unauthorization determination unit 42 counts a value of a variable representing the degree that access to the non-access area is requested from the external device 300, and in a case where the counted value reaches a threshold, determines that the access from the external device 300 is unauthorized. For example, the unauthorization determination unit 42 counts up a value of a variable representing the number of times of determination that the access request is an abnormal request (abnormal read request or abnormal write request), and in a case where the counted-up value exceeds a predetermined threshold, determines that the access from the external device 300 is unauthorized.

The memory access controller 43 controls access to the memory 50. For example, in a case where the abnormality determination unit 41 determines that the access request from the external device 300 is a normal request (normal read request or normal write request), the memory access controller 43 permits access to the memory 50. For example, in a case where the abnormality determination unit 41 determines that the access request from the external device 300 is an abnormal request (abnormal read request or abnormal write request), the memory access controller 43 rejects access to the memory 50.

In a case where the unauthorization determination unit 42 of the unauthorized access determination unit 40 determines that the access from the external device 300 is unauthorized, the memory access controller 43 prohibits read and write access to the memory 50. With this, it is possible to protect the memory 50 from unauthorized access after the access to the memory 50 is prohibited. A special measure to the ECU 30 is taken by authorized equipment provided in a dealer or the like, whereby a prohibition measure of access to the memory 50 is released.

In a case where the unauthorization determination unit 42 of the unauthorized access determination unit 40 determines that the access from the external device 300 is unauthorized, the memory content restoration unit 44 restores the contents of the memory 50 to a state before determination is made that the access from the external device 300 is unauthorized. In a case where there is unauthorized access from the external device 300, there is a possibility that the contents stored in the memory 50 are rewritten. However, according to the memory content restoration unit 44, since it is possible to restore the contents of the memory 50 to a state before there is unauthorized access, it is possible to prevent trouble caused by the contents stored in the memory 50 being rewritten through unauthorized access.

In a case where the abnormality determination unit 41 determines that the access request from the external device 300 is a normal write request, the memory content restoration unit 44 backs up contents stored before writing into a write needed area, to which access is requested. For example, the memory content restoration unit 44 backs up contents stored before writing into a write needed area, to which access is requested, and the address of the write needed area in a free area of the write unneeded area in the memory 50. With the backup in the write unneeded area in the memory 50, it is possible to protect information (backup information) backed up in the write unneeded area from unauthorized access. In a case where determination is made that the access from the external device 300 is unauthorized, the memory content restoration unit 44 restores, based on the backup information stored in the memory 50, the contents of the memory 50 to a state before determination is made that the access from the external device 300 is unauthorized.

In a case where the unauthorization determination unit 42 of the unauthorized access determination unit 40 determines that the access from the external device 300 is unauthorized, the memory content deletion unit 45 deletes the contents written into the memory 50 until determination is made that the access is unauthorized. With this, since it is possible to delete the contents written into the memory 50 through unauthorized access, it is possible to prevent trouble caused by the contents written into the memory 50 through unauthorized access.

Figure 2:
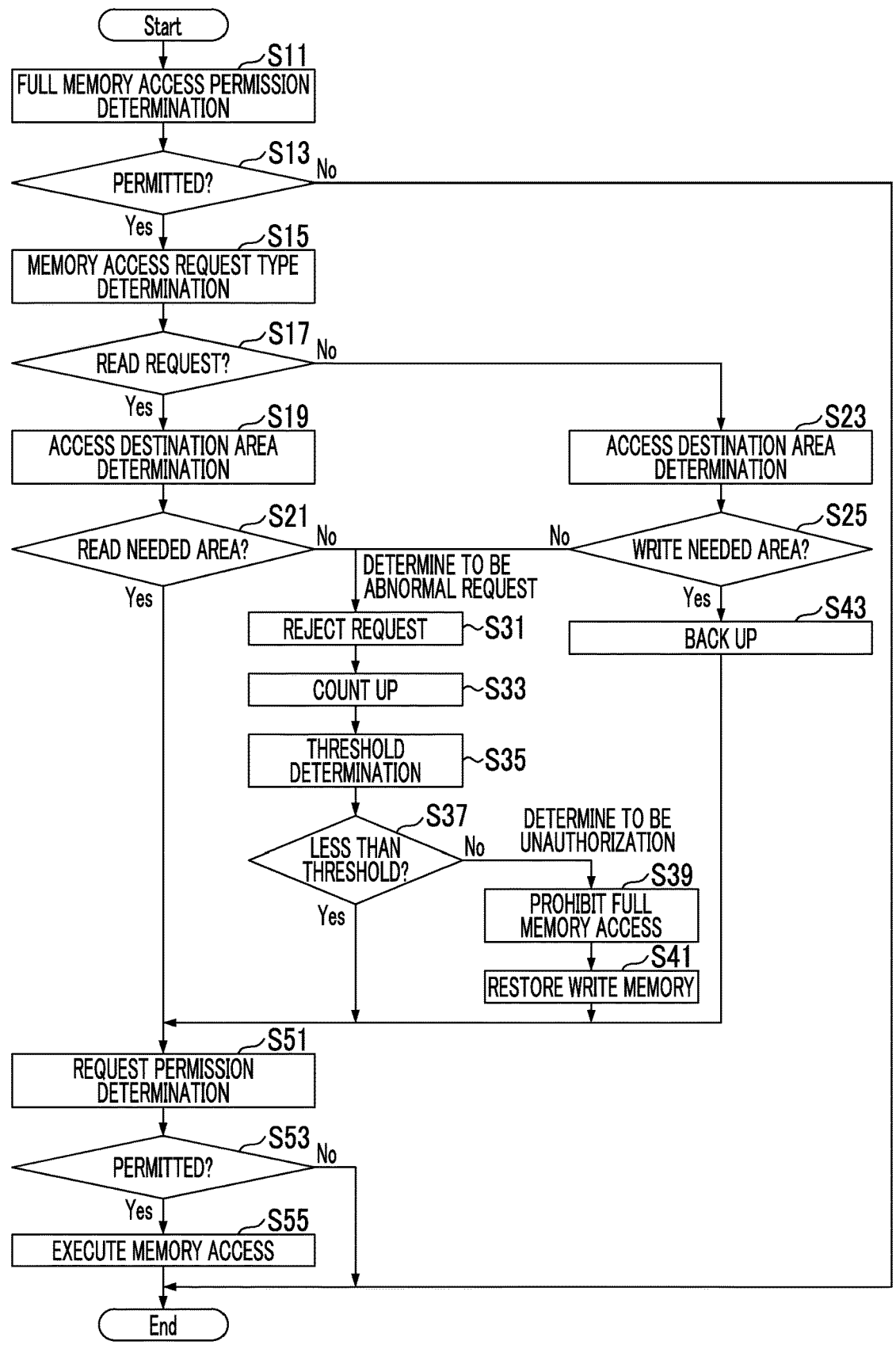
FIG. 2 is a flowchart showing a first example of an unauthorization determination method that is executed by the unauthorization determination system according to the first embodiment.

FIG. 2 is a flowchart showing a first example of an unauthorization determination method that is executed by the unauthorization determination system according to the first embodiment. The ECU 30 of the unauthorization determination system 101 shown in FIG. 1 performs unauthorization determination processing for determining unauthorized access from the external device 300 according to the first example of the unauthorization determination method shown in FIG. 2. In a case where the read or write access request is input from the external device 300, the ECU 30 starts the unauthorization determination processing according to the first example of the unauthorization determination method shown in FIG. 2.

In Step S11, the memory access controller 43 determines whether or not access to all memory areas 1 to 8 of the memory 50 is permitted. In a case where the access to all memory areas 1 to 8 is permitted (in Step S13, Yes), the memory access controller 43 permits processing after Step S15. In a case where the access to all memory areas 1 to 8 is prohibited (in Step S13, No), the memory access controller 43 does not permit (does not perform) the processing after Step S15, and ends the unauthorization determination processing according to the first example of the unauthorization determination method shown in FIG. 2. With this, it is possible to protect all memory areas 1 to 8 from unauthorized access after the access to all memory areas 1 to 8 is prohibited.

In Step S15, the abnormality determination unit 41 determines the type of the access request input from the external device 300. In a case where determination is made that the access request input from the external device 300 is a read request (in Step S17, Yes), the abnormality determination unit 41 performs processing of Step S19. In a case where determination is made that the access request input from the external device 300 is a write request (in Step S17, No), the abnormality determination unit 41 performs processing of Step S23.

In Step S19, the abnormality determination unit 41 determines the type of a memory area that the external device 300 designates as a read target. In a case where a memory address that the external device 300 designates as a read target corresponds to an address of a read needed area, the abnormality determination unit 41 determines that the read access request from the external device 300 is a normal read request (in Step S21, Yes). In a case where the memory address that the external device 300 designates as a read target corresponds to an address of a read unneeded area, the abnormality determination unit 41 determines that the read access request from the external device 300 is an abnormal read request (in Step S21, No).

In Step S23, the abnormality determination unit 41 determines the type of a memory area that the external device 300 designates as a write target. In a case where a memory address that the external device 300 designates as a write target corresponds to an address of a write needed area, the abnormality determination unit 41 determines that a write access request from the external device 300 is a normal write request (in Step S25, Yes). In a case where the memory address that the external device 300 designates as a write target corresponds to an address of a write unneeded area, the abnormality determination unit 41 determines that the write access request from the external device 300 is an abnormal write request (in Step S25, No).

In Step S43, in a case where determination is made that the access request from the external device 300 is a normal write request (in Step S25, Yes), the memory content restoration unit 44 backs up the contents stored before writing into the write needed area, to which access is requested. For example, the memory content restoration unit 44 backs up the contents stored before writing into the write needed area, to which access is requested, and the address of the write needed area in a free area of the write unneeded area in the memory 50.

In Step S31, in a case where determination is made that the access request from the external device 300 is an abnormal request (abnormal read request or abnormal write request), the memory access controller 43 rejects access to the memory 50.

In Step S33, the unauthorization determination unit 42 counts up a value of a variable (hereinafter, referred to as a "variable X") representing the degree that access to a non-access area is requested from the external device 300. For example, the unauthorization determination unit 42 counts up a value of a variable (hereinafter, referred to as a "variable Xa") representing the number of times of determination in Step S21 or Step S25 that the access request from the external device 300 is an abnormal request (abnormal read request or abnormal write request).

In Step S35, the unauthorization determination unit 42 determines whether or not the value of the variable X representing the degree that access to the non-access area is requested from the external device 300 reaches a predetermined threshold. For example, the unauthorization determination unit 42 determines whether or not the value of the variable Xa representing the number of times of determination that the access request is an abnormal request exceeds a predetermined threshold.

In Step S37, in a case where the unauthorization determination unit 42 determines that the value of the variable X does not reach the predetermined threshold (for example, the value of the variable Xa is less than the predetermined threshold), processing of Step S51 is performed. In Step S37, in a case where determination is made that the value of the variable X reaches the predetermined threshold (for example, the value of the variable Xa is equal to or greater than the predetermined threshold), the unauthorization determination unit 42 determines that the access from the external device 300 is unauthorized, and processing of Step S39 is performed.

In a case where determination is made that the access from the external device 300 is unauthorized (in Step S37, No), the memory access controller 43 prohibits access to all memory areas 1 to 8 of the memory 50 after the determination (Step S39). Access is prohibited in Step S39, whereby, in Step S13 described above, determination is made that access to all memory areas 1 to 8 is prohibited.

In Step S41, the memory content restoration unit 44 restores, based on information backed up in Step S43, the contents of the memory 50 to a state before determination is made that the access from the external device 300 is unauthorized. With this, it is possible to prevent trouble caused by the contents stored in the memory 50 being rewritten through unauthorized access.

In Step S41, the memory content deletion unit 45 may delete contents written into the memory 50 until the unauthorization determination unit 42 of the unauthorized access determination unit 40 determines that the access from the external device 300 is unauthorized. With this, since it is possible to delete the contents written into the memory 50 through unauthorized access, it is possible to prevent trouble caused by the contents written into the memory 50 through unauthorized access.

In Step S51, the memory access controller 43 determines whether the abnormality determination unit 41 determines that the access request from the external device 300 is a normal request or determines that the access request from the external device 300 is an abnormal request.

In Step S53, in a case where determination is made in Step S21 or S25 that the access request from the external device 300 is a normal request, the memory access controller 43 permits access to the memory 50. In this case, in Step S55, the memory access controller 43 performs access to the memory 50. The memory access controller 43 reads information from the read needed area designated from the external device 300 or writes information into the write needed area designated from the external device 300.

In Step S53, in a case where determination is made in Step S21 or S25 that the access request from the external device 300 is an abnormal request, the memory access controller 43 does not perform access to the memory 50 and ends the unauthorization determination processing.

As described above, according to the first example of the unauthorization determination method shown in FIG. 2, it is possible to increase confidentiality to unauthorized access from the external device 300.

Figure 3:
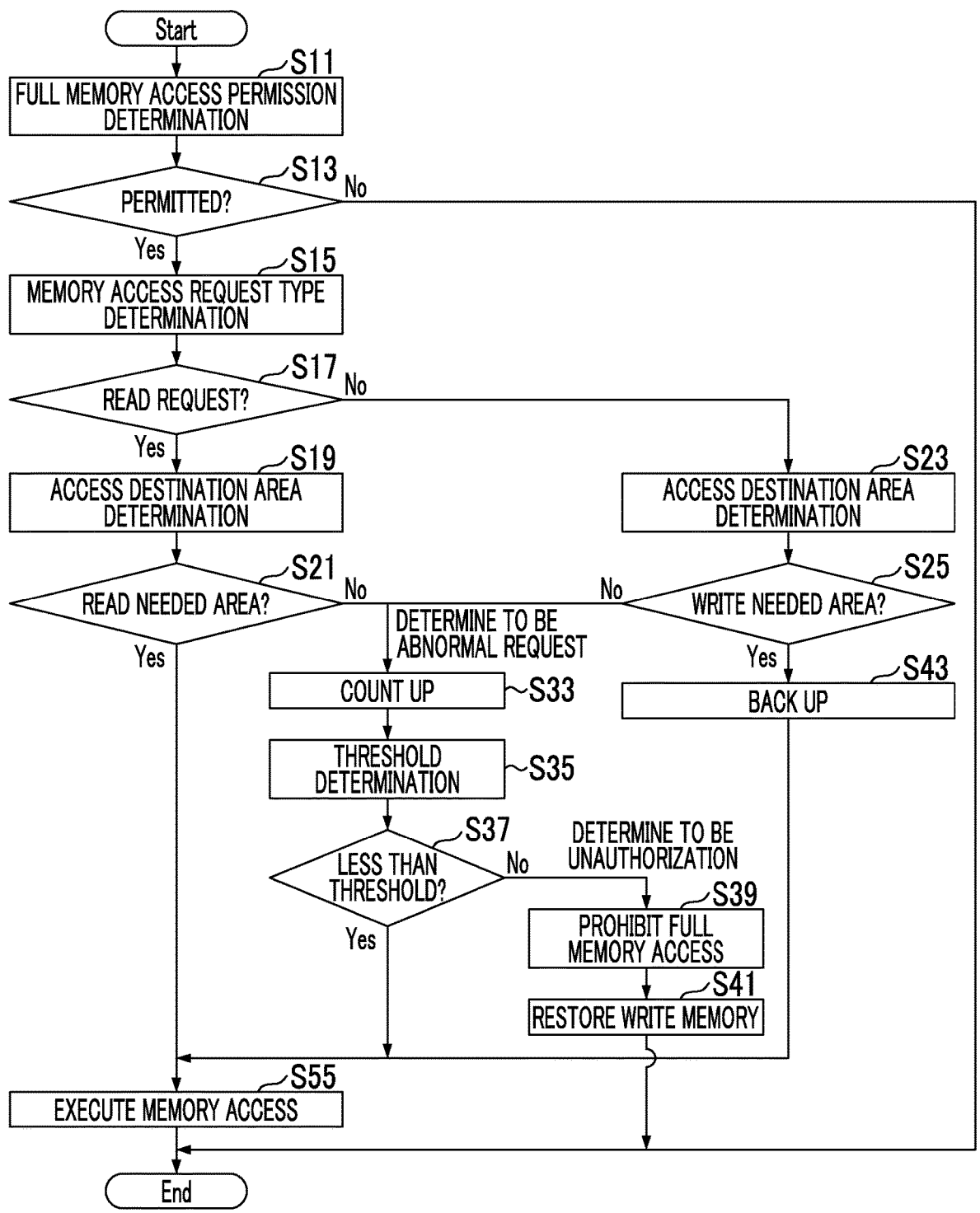
FIG. 3 is a flowchart showing a second example of the unauthorization determination method that is executed by the unauthorization determination system according to the first embodiment.

FIG. 3 is a flowchart showing a second example of the unauthorization determination method that is executed by the unauthorization determination system according to the first embodiment. FIG. 2 described above shows an example where, in a case where access to a non-access area is "requested" from the external device 300, the unauthorized access determination unit 40 does not permit actual access to the non-access area, and determines that the access from the external device 300 is unauthorized. FIG. 3 shows an example where, in a case where a non-access area is "actually" accessed by the external device 300, the unauthorized access determination unit 40 determines that the access from the external device 300 is unauthorized. Hereinafter, description will be provided referring to FIG. 3. In FIG. 3, in regards to the same parts as those in FIG. 2, the above description will be cited.

In FIG. 2, in a case where determination is made in Step S21 or S25 that the access request from the external device 300 is an abnormal request, the memory access controller 43 rejects access to the memory 50. In FIG. 3, in a case where determination is made in Step S21 or S25 that the access request from the external device 300 is an abnormal request, the memory access controller 43 does not reject access to the memory 50.

In Step S33 of FIG. 3, the unauthorization determination unit 42 counts up a value of a variable (hereinafter, referred to as a "variable Y") representing the degree that the non-access area is accessed by the external device 300. Similarly to FIG. 2, for example, the unauthorization determination unit 42 counts up the value of the variable Xa representing the number of times of determination in Step S21 or Step S25 that the access request from the external device 300 is an abnormal request.

In Step S35 of FIG. 3, the unauthorization determination unit 42 determines whether or not the value of the variable Y representing the degree that the non-access area is accessed by the external device 300 reaches a predetermined threshold.

In Step S37 of FIG. 3, in a case where the unauthorization determination unit 42 determines that the value of the variable Y does not reach the predetermined threshold (for example, the value of the variable Xa is less than the predetermined threshold), processing of Step S55 is performed. In Step S37 of FIG. 3, in a case where determination is made that the value of the variable Y reaches the predetermined threshold (for example, the value of the variable Xa is equal to or greater than the predetermined threshold), the unauthorization determination unit 42 determines that the access from the external device 300 is unauthorized, and processing of Step S39 is performed.

Accordingly, in the example of FIG. 3, even in a case where determination is made in Step S21 or S25 that the access request from the external device 300 is an abnormal request, in Step S55, the memory access controller 43 performs access to the memory 50. The memory access controller 43 reads information from the read needed area or the read unneeded area designated from the external device 300 or writes information into the write needed area or the write unneeded area designated from the external device 300.

As described above, in the example of FIG. 3, even in a case where determination is made that the access request from the external device 300 is an abnormal request, access to the memory 50 is permitted. However, in Step S37, in a case where the value of the variable Y reaches the predetermined threshold, finally, determination is made that the access from the external device 300 is unauthorized. For this reason, it is possible to increase confidentiality to unauthorized access from the external device 300.

Next, a modification example of a method of counting the number of the variable X representing the degree that access to the non-access area is requested from the external device or the variable Y representing the degree that the non-access area is accessed by the external device will be shown.

Figure 4:
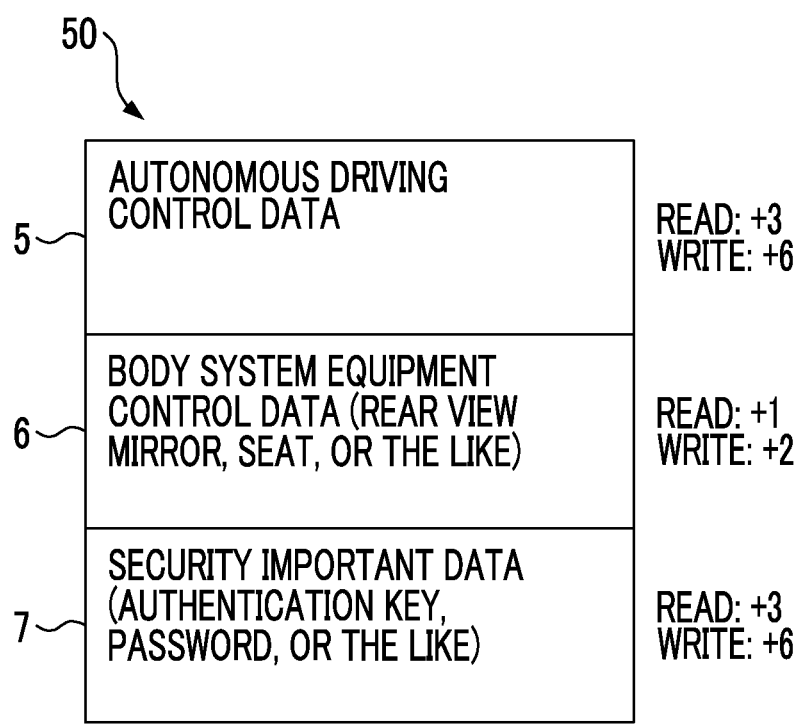
FIG. 4 is a conceptual diagram showing an example of the correspondence relationship between each memory area and points given in advance to each memory area.

FIG. 4 is a conceptual diagram showing an example of the correspondence relationship between each memory area and points given in advance to each memory area.

The unauthorization determination unit 42 of the unauthorized access determination unit 40 changes the value of the variable X with a weight according to the area in the non-access area that the external device 300 requests access for. The unauthorization determination unit 42 of the unauthorized access determination unit 40 changes the value of the variable Y with a weight according to the area in the non-access area that the external device 300 accesses. With this, it is possible to change the degree of change until the value of the variable X or the variable Y reaches the threshold according to the difference of the area in the non-access area that the external device 300 requests access for or the area that the external device 300 accesses. Accordingly, it is possible to change determination sensitivity until determination is made that the access from the external device 300 is unauthorized according to the difference of the area that the external device 300 requests access for or the area that the external device 300 accesses.

For example, points are given in advance to the non-access area in the memory 50 with a weight proportional to the magnitude of an influence of unauthorized access from the external device 300 on the vehicle 100 or a user of the vehicle 100. Specifically, a program or data for controlling a motion of running, turning, stopping, or the like of the vehicle 100 is given points higher than a program or data that does not affect the motion. Important data for security of the vehicle 100 is given points higher than unimportant data on security of the vehicle 100. Write access to the non-access area is given points higher than read access to the non-access area.

In FIG. 4, data for autonomous driving control of the vehicle 100 is stored in a memory area 5. Data for control of body system equipment, such as a side mirror or a seat, is stored in a memory area 6. Important data (for example, an authentication key, a password, or the like) on security of the vehicle 100 is stored in a memory area 7. Information stored in the memory areas 5, 7 has confidentiality higher than information stored in the memory area 6.

The unauthorization determination unit 42 of the unauthorized access determination unit 40 changes the value of the variable X or the variable Y to be greater in a case of access to the memory areas 5, 7 than in a case of access to the memory area 6. With this, determination is easily made in Step S37 of FIGS. 2 and 3 that the access from the external device 300 is unauthorized in a case of access to the memory areas 5, 7 than in a case of access to the memory area 6. Hence, safety of information having comparatively high confidentiality, such as autonomous driving control data, is further improved.

The unauthorization determination unit 42 of the unauthorized access determination unit 40 changes the value of the variable X or the variable Y to be greater in a case of write access to the non-access area than in a case of read access to the non-access area. With this, determination is easily made that the access from the external device 300 is unauthorized in a case of write access to the non-access area than in a case of read access to the non-access area. Hence, it is possible to further increase confidentiality to unauthorized write access.

For example, in FIG. 4, a unit in which the unauthorized access determination unit 40 changes the variable X each time access to the memory area 6 is requested from the external device 300 is "+1" in a case of read access, and is "+2" in a case of write access. The same applies to a unit in which the unauthorized access determination unit 40 changes the variable Y each time the memory area 6 is accessed by the external device 300.

For example, in FIG. 4, a unit in which the unauthorized access determination unit 40 changes the variable X each time access to the memory areas 5, 7 is requested from the external device 300 is "+3" in a case of read access, and is "+6" in a case of write access. The same applies to a unit in which the unauthorized access determination unit 40 changes the variable Y each time the memory areas 5, 7 are accessed by the external device 300.

Figure 5:
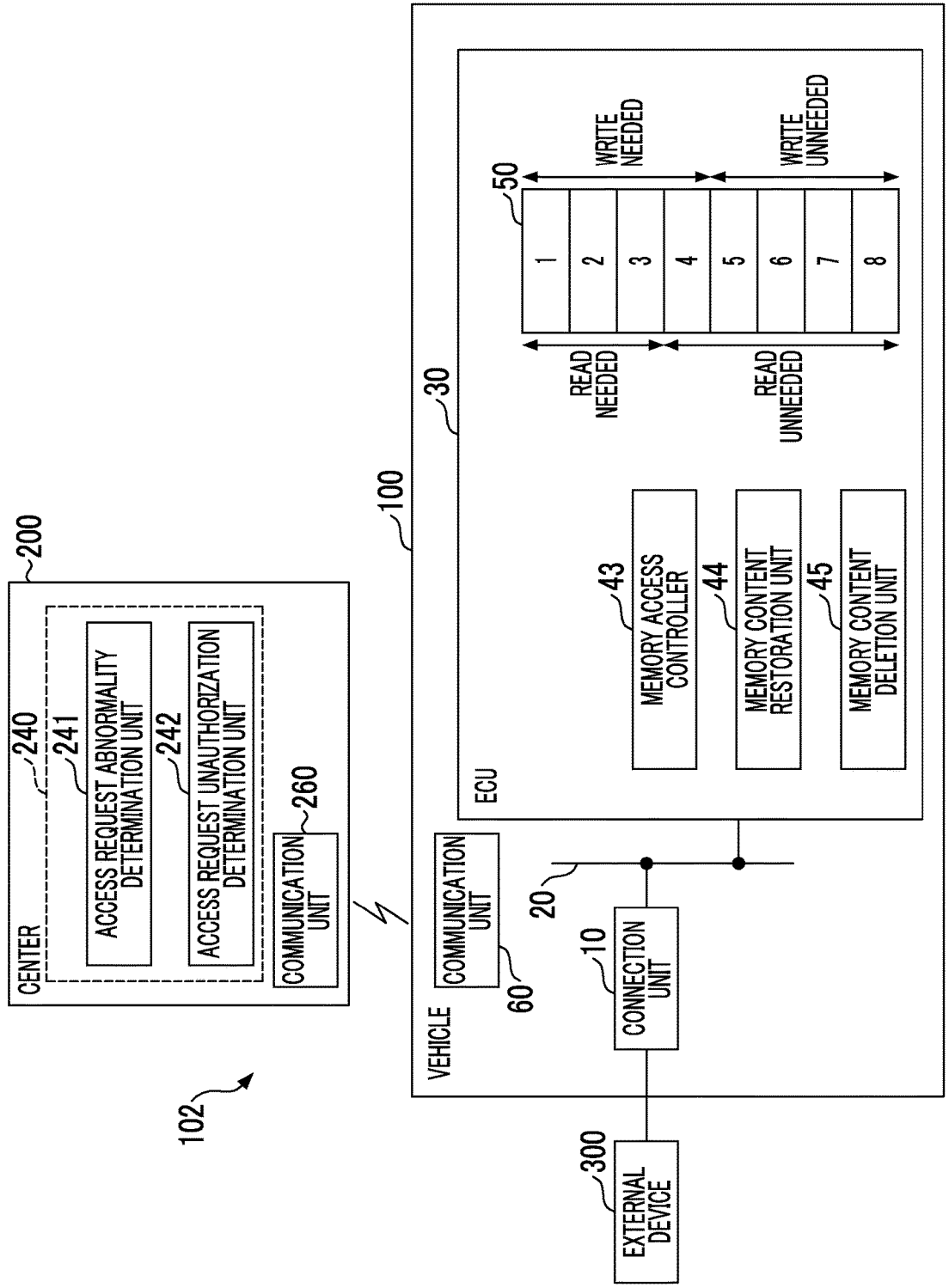
FIG. 5 is a diagram showing an example of the configuration of an unauthorization determination system according to a second embodiment.

FIG. 5 is a diagram showing an example of the configuration of an unauthorization determination system according to a second embodiment. In the first embodiment shown in FIG. 1, the unauthorized access determination unit 40 is provided on the vehicle 100 side. In contrast to the above description, in the second embodiment shown in FIG. 5, an unauthorized access determination unit 240 is provided on a center 200 side at a remote position from the vehicle 100. The center 200 is constituted of a center server having a CPU as an example of a processor and a memory. The functions of the unauthorized access determination unit 240 are realized by a program that is processed by the CPU. A program that realizes the functions is stored in the memory. Hereinafter, description will be provided referring to FIG. 5. In FIG. 5, in regards to the same parts as those in FIG. 1, the above description will be cited.

An unauthorization determination system 102 shown in FIG. 5 determines unauthorized access from the external device 300 connected to the connection unit 10 mounted in the vehicle 100 in a wired or wireless manner. The unauthorization determination system 102 includes the connection unit 10, a communication line 20, an ECU 30, and a communication unit 60 on the vehicle 100 side, and includes an unauthorized access determination unit 240 and a communication unit 260 on the center 200 side.

The communication unit 60 transmits and receives predetermined information to and from the communication unit 260 of the center 200 in a wireless manner. The communication unit 260 transmits and receives predetermined information to and from the communication unit 60 of the vehicle 100 in a wireless manner.

The unauthorized access determination unit 240 has the same functions as the unauthorized access determination unit 40 of the first embodiment, and has an access request abnormality determination unit 241 and an access request unauthorization determination unit 242. Hereinafter, the access request abnormality determination unit 241 is referred to as an abnormality determination unit 241, and the access request unauthorization determination unit 242 is referred to as an unauthorization determination unit 242.

Figure 6:
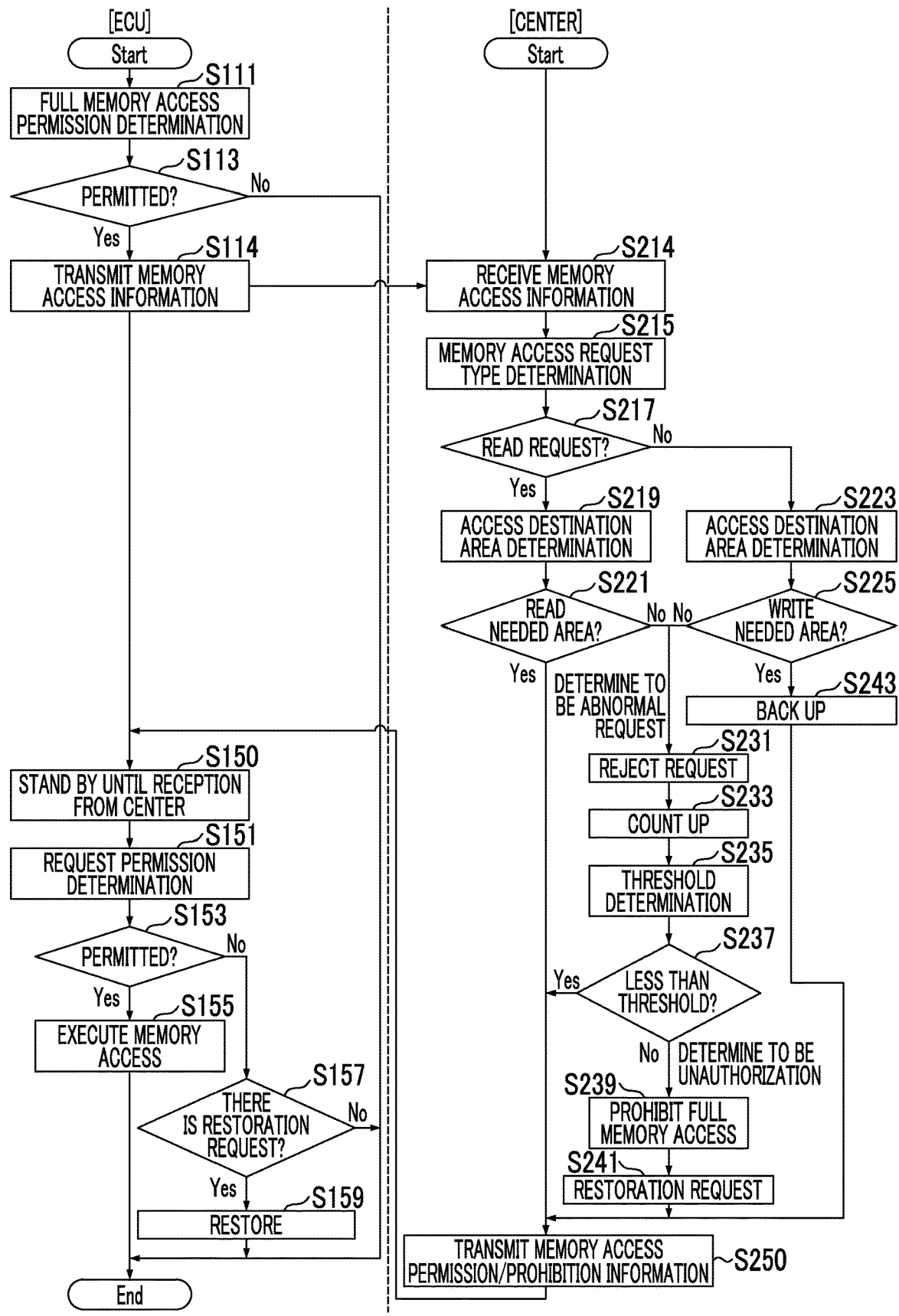
FIG. 6 is a flowchart showing an example of an unauthorization determination method that is executed by the unauthorization determination system according to the second embodiment.

FIG. 6 is a flowchart showing an example of an unauthorization determination method that is executed by the unauthorization determination system according to the second embodiment. Hereinafter, description will be provided referring to FIG. 6. In FIG. 6, in regards to the same parts as those in FIGS. 2 and 3, the above description will be cited.

Steps S111 and S113 are the same as Steps S11 and S13 described above, respectively.

In Step S114, the memory access controller 43 provides memory access information from the external device 300 to the communication unit 60. The communication unit 60 transmits the memory access information provided from the memory access controller 43 toward the center 200 in a wireless manner. The memory access information includes, for example, a memory address that the external device 300 designates as an access target, the type (read request or write request) of an access request input from the external device 300, and the like.

In Step S214, the communication unit 260 receives the memory access information transmitted from the communication unit 60 in a wireless manner. In Step S215, the abnormality determination unit 241 determines the type of an access request input from the external device 300.

Steps S215 to S239, and S243 are the same as Steps S15 to S39, and S43 described above, respectively.

In Step S241, the unauthorization determination unit 242 requests the memory content restoration unit 44 to restore, based on information backed up in Step S243, the contents of the memory 50 to a state before determination is made that the access from the external device 300 is unauthorized. In Step S241, the unauthorization determination unit 242 may request the memory content deletion unit 45 to delete the contents written into the memory 50 until determination is made that the access from the external device 300 is unauthorized.

In Step S250, the unauthorized access determination unit 240 determines whether the abnormality determination unit 241 determines that the access request from the external device 300 is a normal request or determines that the access request from the external device 300 is an abnormal request. Then, the unauthorized access determination unit 240 provides memory access permission/prohibition information representing a determination result to the communication unit 260. The communication unit 260 transmits the memory access permission/prohibition information provided from the unauthorization determination unit 242 toward the vehicle 100 in a wireless manner. At this time, the communication unit 260 transmits a restoration request or a deletion request of the contents of the memory 50 toward the vehicle 100 in a wireless manner.

In Step S150, the communication unit 60 receives the memory access permission/prohibition information transmitted from the communication unit 260 in a wireless manner. In Step S151, the memory access controller 43 determines whether the abnormality determination unit 241 determines that the access request from the external device 300 is a normal request or determines that the access request from the external device 300 is an abnormal request based on the memory access permission/prohibition information.

Steps S153 and S155 are the same as Steps S53 and S55 described above, respectively.

In Step S157, the memory content restoration unit 44 determines whether or not there is a restoration request. In a case where there is a restoration request, in Step S159, the memory content restoration unit 44 restores, based on information backed up in Step S243, the contents of the memory 50 to a state before determination is made that the access from the external device 300 is unauthorized. With this, it is possible to prevent trouble caused by the contents stored in the memory 50 being rewritten through unauthorized access.

Although the unauthorization determination system and the unauthorization determination method have been described above in connection with the embodiments, the present disclosure is not limited to the above-described embodiments. Various modifications and improvements, such as combinations of a part or all of other embodiments or substitutions, may be made without departing from the scope of the present disclosure.

For example, the memory 50 may be a memory that is unwritable and solely readable. In each memory area of the memory 50, solely one of a write needed area or a write unneeded area may be set in advance, or solely one of a read needed area or a read unneeded area may be set in advance.

The unauthorization determination unit 42 may count down the value of the variable representing the degree that access to the non-access area is requested from the external device 300 or the degree that the non-access area is accessed by the external device 300. In this case, in a case where the counted-down value reaches the threshold, the unauthorization determination unit 42 determines that the access from the external device 300 is unauthorized.

What is claimed is:

1. An unauthorization determination system comprising:
    a memory device that is mounted in a vehicle and includes a predetermined non-access area;
    a connection device mounted in the vehicle and configured to be connected to an external device in a wired or wireless manner; and
    an electronic control unit comprising a memory and a processor configured to, in a case where a value of a variable representing a degree that access to the non-access area is requested from the external device or in a case where a degree that the non-access area is accessed by the external device reaches a threshold, determine that the access from the external device is unauthorized and output a determination result.

2. The unauthorization determination system according to claim 1, wherein the electronic control unit is configured to change the value of the variable with a weight according to an area in the non-access area that the external device requests access for or an area in the non-access area that the external device accesses.

3. The unauthorization determination system according to claim 2, wherein:
    the non-access area includes a first area where first information is stored, and a second area where second information having confidentiality higher than the first information is stored; and
    the electronic control unit is configured to change the value of the variable to be greater in a case of access to the second area than in a case of access to the first area.

4. The unauthorization determination system according to claim 1, wherein the electronic control unit is configured to change the value of the variable to be greater in a case of write access to the non-access area than in a case of read access to the non-access area.

5. The unauthorization determination system according to claim 1, wherein the electronic control unit is configured to, in a case where determination is made that the access from the external device is unauthorized, prohibit access to the memory device.

6. The unauthorization determination system according to claim 1, wherein the electronic control unit is configured to restore the contents of the memory device to a state before determination is made that the access from the external device is unauthorized.

7. The unauthorization determination system according to claim 6, wherein the electronic control unit is configured to restore contents deleted from the memory device before determination is made that the access from the external device is unauthorized.

8. The unauthorization determination system according to claim 1, wherein the electronic control unit is configured to delete contents written into the memory device until determination is made that the access from the external device is unauthorized.

9. An unauthorization determination method that determines unauthorized access from an external device connected to a connection device mounted in a vehicle in a wired or wireless manner, the unauthorization determination method comprising, in a case where a value of a variable representing a degree that access to a non-access area defined in a memory device mounted in the vehicle is requested from the external device or in a case where a degree that the non-access area is accessed by the external device reaches a threshold, determining that the access from the external device is unauthorized.

10. An unauthorization determination system comprising:
    a memory device that is mounted in a vehicle and includes a predetermined non-access area; a connection device mounted in the vehicle and configured to be connected to an external device in a wired or wireless manner; and
    a center comprising a memory and a processor configured to, in a case where a value of a variable representing a degree that access to the non-access area is requested from the external device or in a case where a degree that the non-access area is accessed by the external device reaches a threshold, determine that the access from the external device is unauthorized and output a determination result.

11. The unauthorization determination system according to claim 10, wherein the center is configured to change the value of the variable with a weight according to an area in the non-access area that the external device requests access for or an area in the non-access area that the external device accesses.

12. The unauthorization determination system according to claim 11, wherein:
    the non-access area includes a first area where first information is stored, and a second area where second information having confidentiality higher than the first information is stored; and
    the center is configured to change the value of the variable to be greater in a case of access to the second area than in a case of access to the first area.

13. The unauthorization determination system according to claim 10, wherein the center is configured to change the value of the variable to be greater in a case of write access to the non-access area than in a case of read access to the non-access area.

14. The unauthorization determination system according to claim 10, further comprising an electronic control unit configured to, in a case where the center determines that the access from the external device is unauthorized, prohibit access to the memory device.

15. The unauthorization determination system according to claim 10, further comprising an electronic control unit configured to restore the contents of the memory device to a state before the center determines that the access from the external device is unauthorized.

16. The unauthorization determination system according to claim 15, wherein the electronic control unit is configured to restore contents deleted from the memory device before determination is made that the access from the external device is unauthorized.

17. The unauthorization determination system according to claim 10, further comprising an electronic control unit configured to delete contents written into the memory device until the center determines that the access from the external device is unauthorized.

* * * * *